United States Patent
Magee

Patent Number: 5,933,276
Date of Patent: *Aug. 3, 1999

[54] ABERRATION-FREE DIRECTIONAL IMAGE WINDOW SHEET

[75] Inventor: John Allan Magee, Fayetteville, Ark.

[73] Assignee: Board of Trustees, University of Arkansas, N.A., Little Rock, Ark.

[*] Notice: This patent is subject to a terminal disclaimer.

[21] Appl. No.: 09/080,901

[22] Filed: May 18, 1998

Related U.S. Application Data

[60] Division of application No. 08/882,519, Jun. 25, 1997, which is a continuation-in-part of application No. 08/227,055, Apr. 13, 1994, Pat. No. 5,644,431.

[51] Int. Cl.$^6$ .................................................. G03B 21/60
[52] U.S. Cl. .................................................. 359/455
[58] Field of Search ............................ 359/619, 455, 359/454, 456

[56] References Cited

U.S. PATENT DOCUMENTS

| | | | |
|---|---|---|---|
| 1,943,995 | 1/1934 | Weld | 359/619 |
| 2,815,310 | 12/1957 | Anderson | 154/122 |
| 2,991,693 | 7/1961 | MacNeille | 359/455 |
| 3,002,051 | 9/1961 | Tait | 359/455 |
| 3,012,477 | 12/1961 | Lodge | 52/306 |
| 3,119,195 | 1/1964 | Braunhut | 359/619 |
| 3,250,173 | 5/1966 | Henry | 359/463 |
| 3,255,665 | 6/1966 | Weiher et al. | 359/595 |
| 3,365,350 | 1/1968 | Cahn | 359/463 |
| 3,468,545 | 9/1969 | Anderson | 359/619 |
| 3,524,014 | 8/1970 | Watanabe | 178/5.4 |
| 3,565,733 | 2/1971 | Leach | 359/455 |
| 3,653,138 | 4/1972 | Cooper | 40/453 |
| 4,021,945 | 5/1977 | Sussman | 40/448 |
| 4,034,555 | 7/1977 | Rosenthal | 58/127 |
| 4,069,809 | 1/1978 | Strand | 52/606 |
| 4,208,086 | 6/1980 | Perry | 359/744 |
| 4,279,244 | 7/1981 | McAlister | 126/698 |
| 4,305,383 | 12/1981 | Bloxsom | 126/698 |
| 4,307,710 | 12/1981 | Natler | 126/700 |
| 4,327,708 | 5/1982 | Taylor | 126/629 |
| 4,461,278 | 7/1984 | Mori | 126/700 |

(List continued on next page.)

FOREIGN PATENT DOCUMENTS

569237  7/1958  Belgium ............................. 52/306

*Primary Examiner*—Safet Metjahic
*Assistant Examiner*—Christopher E. Mahoney
*Attorney, Agent, or Firm*—Robert R. Keegan; Head, Johnson & Kachigian

[57] ABSTRACT

There is disclosed a partially transparent, directional viewing sheet formed of plastic material with convex and concave lenses of elliptical cross-section, preferably lenticular lenses, formed respectively on the front and back surfaces of the sheet, there being intervening spaces with convex surfaces between the concave lenses which spaces are not transparent to images and may be imprinted with an image that is viewable through the sheet from some directions. Preferably the concave lens focal length is typically about one-half of the focal length of the convex lens. Elliptical cross-section of the lenses minimizes spherical aberration and sharpens the focus. The thickness of the sheet causes focal points of the lenses to substantially coincide producing the effect of a tiny Galilean telescope. The view through such a sheet in a direction substantially aligned with the optical axis of the tiny telescope is a minimally distorted view of objects distant from or near to the opposite side of the sheet while off-axis viewing will present the image imprinted on the intervening convex surfaces between the concave lenses on the back surface of the sheet. Such convex surfaces are preferred over flat surfaces for high speed printing in offset printing presses.

18 Claims, 5 Drawing Sheets

U.S. PATENT DOCUMENTS

| | | | |
|---|---|---|---|
| 4,509,823 | 4/1985 | Moriguchi | 359/457 |
| 4,541,727 | 9/1985 | Rosenthal | 368/232 |
| 4,557,253 | 12/1985 | Talbert et al. | 126/632 |
| 4,634,220 | 1/1987 | Hockert et al. | 350/167 |
| 4,867,514 | 9/1989 | Waldron | 359/744 |
| 4,924,356 | 5/1990 | French | 362/31 |
| 4,935,335 | 6/1990 | Fotland | 430/324 |
| 4,993,790 | 2/1991 | Vick | 359/20 |
| 5,191,472 | 3/1993 | Kurematsu | 359/619 |
| 5,216,543 | 6/1993 | Calhoun | 359/619 |
| 5,270,859 | 12/1993 | Wirth et al. | 359/744 |
| 5,276,478 | 1/1994 | Morton | 355/22 |
| 5,303,525 | 4/1994 | Magee | 52/306 |
| 5,461,495 | 10/1995 | Steenblik et al. | 359/463 |
| 5,494,445 | 2/1996 | Sekiguchi | 434/365 |
| 5,543,965 | 8/1996 | Bielinski | 359/463 |
| 5,593,913 | 1/1997 | Aoki | 437/53 |
| 5,611,611 | 3/1997 | Ogino et al. | 353/74 |
| 5,642,226 | 6/1997 | Rosenthal | 359/619 |
| 5,694,246 | 12/1997 | Aoyama et al. | 359/619 |

ABERRATION-FREE DIRECTIONAL IMAGE WINDOW SHEET

CROSS-REFERENCE TO RELATED APPLICATION

This application is a division of patent application Ser. No. 08/882,519, filed Jun. 25, 1997 and entitled DIRECTIONAL IMAGE WINDOW SHEET which is a continuation-in-part of application titled: DIRECTIONAL IMAGE TRANSMISSION SHEET AND METHOD OF MAKING SAME, Serial No. 08/227,055, filed Apr. 13, 1994, now U.S. Pat. No. 5,644,431, and incorporated herein by reference.

Applicants, by their attorney, disclaim the term of all patent claims granted on this application subsequent to the final expiration of U.S. Pat. No. 5,644,431, having common ownership with this application pursuant to 37 CFR 1.321(b) and (c).

SUMMARY OF THE INVENTION

The present invention relates to transparent or semi-transparent sheets which are configured to transmit certain light energy images having certain directions of propagation while reflecting, absorbing, or modifying images or energy from other directions. Such sheet material is useful for producing panels for controlled solar heating, in controlling light transmission in building windows, in greenhouses, as described in my prior patents but has further uses, for example, for computer display screens, and in imprinted packaging film. The relevant portions of the description of my previous applications or patents identified herein is incorporated by reference.

It has long been known to incorporate lenticular lenses in a surface of thin plastic sheet material and to place a printed image on the opposite surface of the sheet material arranged so that the apparent image as viewed from different directions depends upon the direction of viewing with three or more different images being presented to the viewer as the direction of viewing changes. Such sheet materials have been used to produce moving image novelties and to produce stereoscopic effects and three-dimensional illusions. It has also been known to produce partially transparent film material having opaque striations formed within the sheet to produce the effect of louvers within the transparent sheet material. Such louver simulating material has a high transmission coefficient for light energy in certain directions while having a very low or near-zero light transmission coefficient for other directions. The louver simulating sheet material could have louvers of light absorbing or light reflecting composition. Examples of such prior devices for directional transmission of light energy and images are shown in U.S. Pat. No. 3,653,138 (U.S. Cl. 40/130R) and U.S. Pat. No. 4,021,945 (U.S. Cl. 40/28C). Other disclosures of lenticular lens arrays include my patent for SIDING OR ROOFING EXTERIOR PANELS FOR CONTROLLED SOLAR HEATING, Ser. No. 07/948,109, filed Sep. 21, 1992, now U.S. Pat. No. 5,303,525, and those cited as references in U.S. Pat. No. 5,303,525.

According to the present invention, a transparent or partially transparent sheet material is provided which has convex lenses formed on the front surface and concave lenses formed on the back surface of the sheet. In the preferred embodiments the convex lenses on the front surface will have a larger radius of curvature (and a longer focal length) than the concave lenses on the back surface and will have an elliptical arc (rather than circular) cross-section. Also in the preferred embodiments the convex lenses with the larger radius of curvature will substantially cover the surface on which they are formed with substantially no intervening non-convex surfaces while the concave lenses with the smaller radius of curvature will also have a smaller aperture, and, as they are equal in number to the larger lenses, there will be a space between the small radius lenses which will normally be a non-concave and at least partially convex surface. This intervening non-concave surface may occupy approximately half the area of the sheet on the back side and may be imprinted by generally conventional printing techniques with a desired monochrome or multi-color image, for example, one suitable for packaging film or incorporation in a product package. As will later be explained, the preferred embodiment of the directional image transmission sheet is capable of presenting an effectively transparent characteristic with a high transmission coefficient and low distortion for viewing from the front in one direction, such as perpendicular to the sheet. When viewed from another direction, such as at a side angle of 45°, the sheet does not appear to be transparent, but rather the printed matter on the back surface of the sheet is visible substantially without distortion.

In addition to providing the features and advantages discussed above, it is an object of the present invention to provide a thin transparent plastic sheet material having convex elliptical cross-section lenses embossed or otherwise formed in a front surface thereof which match one-to-one with concave lenses embossed or otherwise formed in the back surface of the sheet with the effective radii of curvature of the lenses being determined to cause the focal point of each lens on the front surface to substantially coincide with the focal point of the corresponding lens on the back surface whereby a Galilean telescope effect is produced allowing images to be viewed through the sheet material substantially without distortion from a direction perpendicular or nearly perpendicular to the sheet material.

It is another object of the present invention to provide such a sheet material wherein the concave lenses on the back surface of the sheet have a radius of curvature of no greater than about three-quarters the radius of curvature of the convex lenses on the front surface of the sheet.

It is still another object of the present invention to provide such a sheet material wherein the lenses are elongated lenticular lenses arranged in a parallel fashion and wherein the width of the lenses is less than about one millimeter (about 0.04 inches).

It is yet another object of the present invention to provide such a sheet material wherein the lenses on the back surface are concave and of substantially less width than those on the front surface so that there are intervening spaces between the concave lenses, and such surfaces are non-concave and adapted to be imprinted with a solid color or an information imparting pattern which may be viewed only from oblique angles from the front surface of the sheet material.

BRIEF DESCRIPTION OF THE DRAWINGS

Other objects and advantages of the present invention will be apparent from consideration of the following description in conjunction with the appended drawings in which:

FIG. 1-A is a greatly enlarged sectional view of an image transmission sheet material according to the invention;

FIG. 1-B is an alternative embodiment of a greatly enlarged sectional view of an image transmission sheet material according to the invention;

FIG. 1-C is a further alternative embodiment of a greatly enlarged sectional view of an image transmission sheet material according to the invention;

DETAILED DESCRIPTION OF THE PREFERRED EMBODIMENTS

Figure 1A:
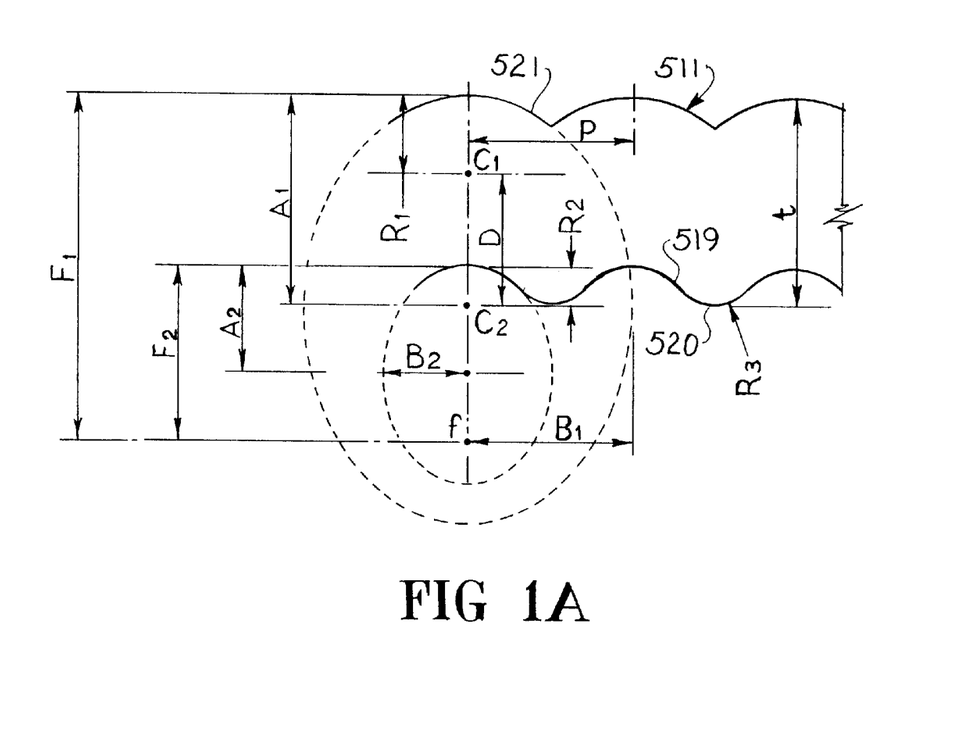
Figure 2:
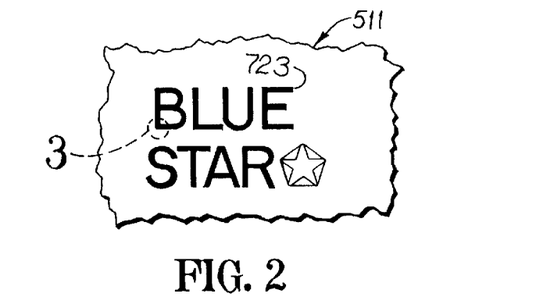
FIG. 2 is a top plan view of sheet material as shown in FIG. 1-A, having advertising graphic material imprinted thereon.
Figure 3:
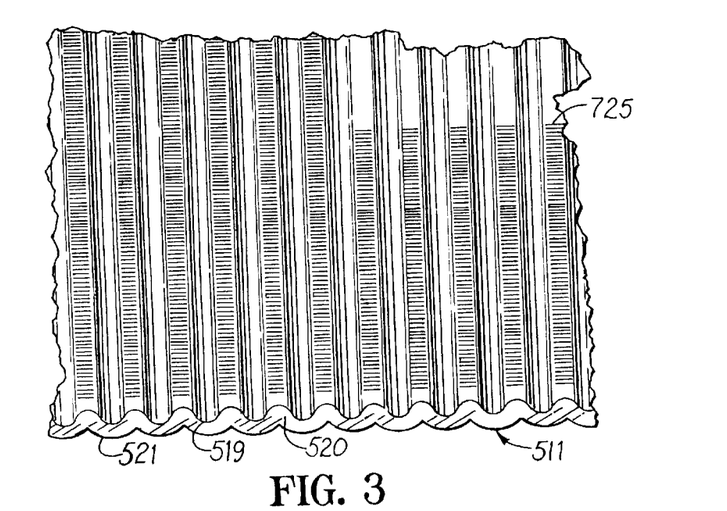
FIG. 3 is a greatly enlarged perspective view from the bottom of the material of FIG. 2, showing the area indicated by 3 in FIG. 2.

Referring to the drawings and particularly FIGS. 1-A, 2, and 3, a sheet material 511 is shown which is formed of transparent plastic material which may be very flexible, somewhat rigid, or very rigid. Plastic materials that may be employed include polyvinyls, acrylics, or other forms of polymerized organic compounds. While organic plastic composition is preferred for the sheet material 511, it would be possible to implement the invention with sheet material formed of glass, or other inorganic or non-plastic materials. A preferred plastic material is PET-G, index of refraction of 1.567. The primary uses of the invention involve visible light, but its use with infrared or ultraviolet light is not precluded.

The top or first surface of the sheet material 511 has converging lenses 521 formed therein as smooth convex cylindrical protuberances in sheet material 511. The bottom or back surface of the sheet material 511 has lenses 519 formed therein by smooth, concave, cylindrical surfaces acting as diverging lenticular lenses. Lenses 519 and 521 each have an elliptical arc cross-section rather than a circular arc cross-section, as specified in Table 1 below.

The lenses 519 are registered with lenses 521, and in the example of FIG. 1-A, lenses 519 are optically coaxial with lenses 521. Lenses 519 are of lesser width than lenses 521 and the spaces between lenses 519 resulting from this lesser width are generally convex curved surface portions 520.

In FIG. 1-A certain dimensions and locations are assigned reference letters for convenience in explaining the inventions. The overall thickness of the sheet material 511 is designated by t. The center to center spacing of the senses 521 which is also the center to center spacing of the lenses 519 is designated P. The lenses 521 and 519 in FIG. 1-A are illustrated as being cylinders having precisely elliptical configurations, but it will be understood that similar but more complex non-circular shapes could be employed in accordance with known optical techniques.

In FIG. 1-A the center of curvature of the circular surface of one of the lenses 521 is indicated at $C_1$. The center of curvature of the corresponding concave lens 519 circular surface is indicated at $C_2$. The corresponding radii of curvature are indicated by reference letters $R_1$ and $R_2$. The focal point for the lenses 521 and 519 substantially coincide and are indicated at f in FIG. 1-A. In accordance with known optical principles the focal length and focal point may be determined from the effective radius of curvature $R_1$ or $R_2$ and the index of refraction of the material of which sheet 511 is formed.

Figure 1B:
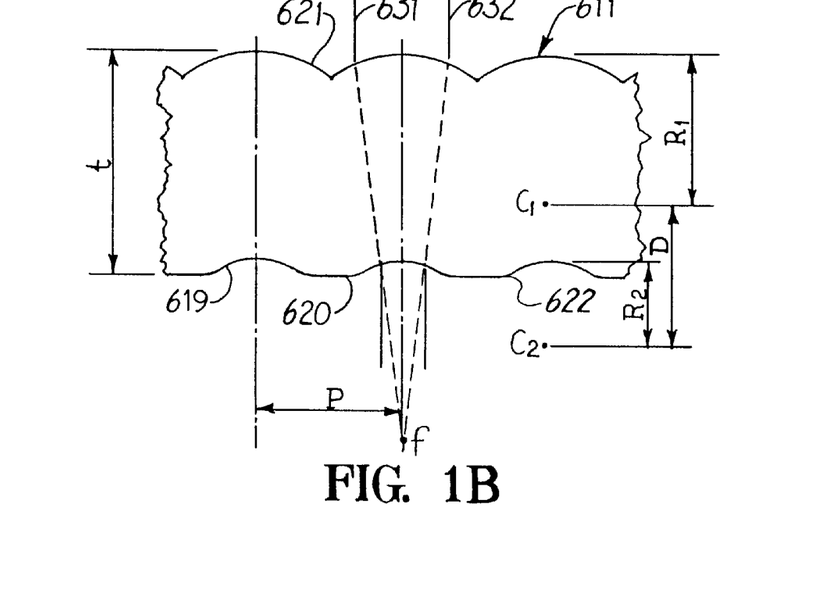

Although not illustrated in FIG. 1-A (see FIG. 1-B or FIG. 4), parallel rays of light which are caused to converge by lenses 521 will be caused to diverge by lenses 519 by just the amount necessary to restore them to parallelism. This is a consequence of the fact that focal points of the lenses 519 and 521 are approximately coincident.

Figure 4:
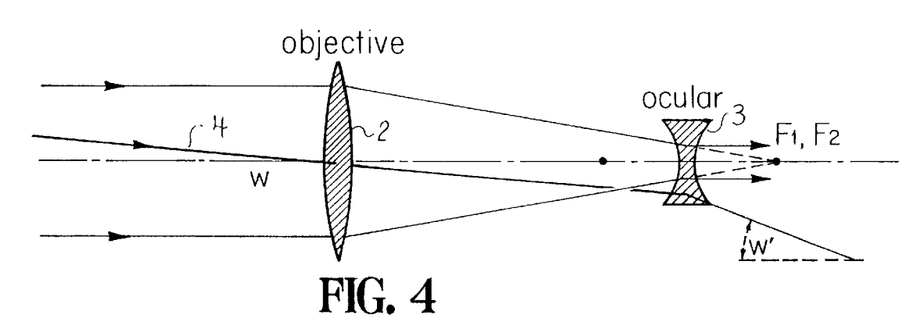
FIG. 4 is an illustration of a prior art Galilean telescope useful in explaining the invention.

The optical characteristics and functions of the transparent sheet material illustrated in FIG. 1-A can more readily be understood by considering the schematic diagram of a Galilean telescope shown in FIG. 4. A Galilean telescope normally comprises a single converging objective convexo-convex lens 2 and a single diverging ocular convexo-concave lens 3. When used as a telescopic viewing device the arrangement in FIG. 4 would view an object far to the left with the viewer's eye placed relatively close at the right of ocular lens 3. For focusing on an object at infinity (a relatively great distance) the distance between the objective lens and ocular lens is adjusted so that the focal point of the objective lens ($F_1$) substantially coincides with a point $F_2$ at a distance from the ocular lens equal to the focal length of the ocular lens.

The Galilean telescope provides a limited amount of image magnification equal to the ratio of the longer focal length of the objective lens to the shorter focal length of the ocular lens. This is indicated in FIG. 4 where a ray designated 4 from a distant point is shown to have an angle of incidence W at the objective which after passing through objective 2 and ocular 3 has a substantially greater angle W. The Galilean telescope has a disadvantage of low magnification, but has the advantage of producing an erect image rather than an inverted image. Neither the degree of magnification of the Galilean optical system nor the fact that is presents an erect image is of particular importance in regard to the present invention.

The Galilean telescope has another characteristic which is important, however. The position of the object being viewed and the eye of the viewer can be reversed from that previously described so that the viewers eye is to the left of the objective and the object to be viewed is to the right of the ocular. In this situation particularly, the distance of the eye of the viewer from the objective 2 is of little consequence. When objects are viewed in this reverse fashion through the Galilean telescope, the image is diminished rather than magnified, but as will be seen, this is not significant as respects the present invention. It should be pointed out that Galilean telescopes have spherical or aspherical lenses whereas the lenses that are described relative to FIGS. 1, 2, and 3, are cylindrical lenticular lenses. Thus, the optical effects described above are observed in only one dimension, and in the dimension at right angles to that one dimension there is essentially no convergence or divergence, or other dominant optical effect for incident rays.

Referring now particularly to FIGS. 2 and 3, FIG. 2 shows the appearance of a large area of sheet 511 on which there has been imprinted an image 723. The image 723 may be any type of decorative or informative graphic or textual information; in FIG. 2 it is represented as product identification as might be used in sheet material used for packaging film. FIG. 2 represents the appearance of sheet material 511 when viewed from a direction that will cause the image 523 imprinted on the back of sheet material 511 to be visible.

FIG. 3 is a perspective view of a greatly enlarged fragmentary portion of the sheet material indicated by the dashed circle and identifying numeral 3 in FIG. 2. In addition to showing the convex lens surfaces 521, the concave lens surfaces 519, and the intervening surfaces 520, imprinting 725 is shown which produces the image 723 seen in FIG. 2 as will be explained hereinafter. It will be noted that the imprint 725 on sheet material 511 is only laid down on portions of the intervening surfaces 520. It will usually be desired to print that portion of the intervening surfaces 520 not within imprint 725 with a white pigment or other background shade or color. Conventional plastic film printing equipment and techniques may be used for imprinting of sheet material 511 if it is flexible film suitable for packaging.

It has been found to be advantageous to make the intervening spaces 520 with a convex arcuate surface, which may conveniently be a circular arc of from 90° to 150°. The intervening space arc may or may not be tangent to the convex lens arc at the point where they join.

Figure 1C:
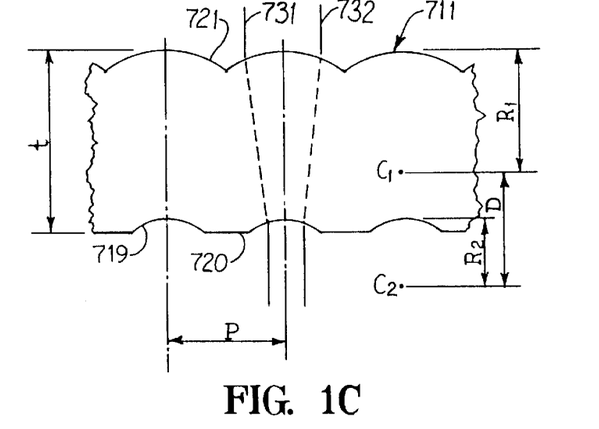

While printing on flat intervening spaces 720 as shown in FIG. 1-C can be accomplished by several various printing methods, presses and methods commonly used for high speed printing of plastic film for packaging or other purposes operate much more effectively on the film sheet 511 illustrated in FIGS. 1-A, 2 and 3 with the intervening spaces 520 of convex arcuate form. Flat intervening spaces create edges or corners at their junction with the convex lens and offset printing processes of high speed presses tend to cause ink to overrun into the lens area. On the other hand, arcuate intervening spaces, such as 520, allow the area to be imprinted to be closely controlled by adjusting pressure of the printing rolls thus avoiding migration of printing ink into the convex lens case.

Although it is believed that the function and operation of the directional image transmission sheet 511 is apparent from the previous description, the function may be more fully explained as follows. The convex lenticular lenses 521 and the concave lenticular lenses 519 are proportioned with respect to radius of curvature and are spaced apart by a distance that relates to the index of refraction of the transparent material of sheet 511 in a way such that each pair of lenses 521 and 519 functions in a manner similar to a Galilean telescope (usually, but not always, one focused at infinity).

In FIG. 1-A the center of curvature for the near-circular arc of one of the lenses 521 is indicated at $C_1$ and the center of curvature of the arc of one of lenses 519 is indicated at $C_2$. In the embodiment illustrated in FIG. 1-A the focal points of lenses 521 coincide with the focal points of lenses 519 and one such coincident focal point is indicated at f. It is notable that while one might think it desirable to have the centers of curvature for lenses 721 and 719 be coincident, this is found to be undesirable and substantially inoperative for indices of refraction of common material. Certain useful dimensions are labeled in FIG. 1-A with the thickness of sheet material 511 at its thickest points being designated t, typically 0.0160", the effective radius of curvature of lenses 519 being designated $R_2$, typically 0.00481", and the radius of curvature of lenses 521 being designated $R_1$, typically 0.00962". The center-to-center distance or pitch of the lenses 521 (and also of the lenses 519) is designated P, typically 0.0125". The distance between centers of curvature $C_1$ and $C_2$ is designated D. The major semi-axis of the ellipse for a convex lens is $A_1$ and for a concave lens is $A_2$; the minor semi-axis of the ellipse for a convex lens is $B_1$ and for a concave lens is $B_2$. The relation between R (effective radius of curvature on the major axis) and the semi-axes is known to be given by $R = B \times B / A$.

Table 1 herein below gives exemplary dimensions for the sheet material embodiment of FIG. 1-A and alternative embodiments. The optical function of the sheet material of FIG. 1-A, 1-B, and 1-C is similar to that of a Galilean telescope focused at infinity in that rays indicated (In FIG. 1-B) at 631 and 632 which enter a lens 621 with parallel directions of propagation are partially converged within sheet material 611 but are then diverged by a lens 619 whereby they are again rendered approximately parallel.

For some uses of sheet material such as 511, one may prefer that the telescope effect of the lenses 521 and 519 be altered to simulate a Galilean telescope focused at a closer distance rather than at infinity, and in such case, the lenses 519 and 521 would be spaced farther apart and their focal points would not exactly coincide. To some extent, the lenses 519 and 521 are operative for the invention functions when closer together than for coincident focus points, but this is not usually preferred. Generally lens spacing is preferably from 0.8 to 1.2 times the coincident focus distance.

In FIG. 1-A lenses 521 are formed of elliptical arc cross-section subtending an angle of approximately 80° (plus and minus 40° within the circle of effective radius). In some applications, such as solar energy control film, one may wish to have arcs of cross-section subtend greater angles up to 90° or 120° to achieve a greater range of acceptance angle for the optical arrangement. In other cases one may wish to have the arc of lenses 521 subtend an angle of 60° or less.

It is well known that spherical or cylindrical lenses of circular arc cross-section suffer from a deficiency known as spherical aberration. The adverse effect of spherical aberration arises when the circular arc curve does not provide the appropriate angle of incidence for a ray parallel to and distant from the optical axis with the result that the refraction angle for such rays causes them to have a focal point closer to the lens than for near axial rays, hence causing imperfect focusing. In the optical arts aspheric lenses have been developed to greatly reduce the effects of spherical aberration and such techniques can be employed in the design of the optics of sheet material according to the present invention. Complex mathematical calculations are employed to generate lens curvatures with aspheric properties and such curves may not conform to simple geometric functions. An elliptical curve cross-section is a simple geometric form which is employed according to the invention to alleviate the problem of spherical aberration, at least in part. Herein the term "elliptical curve or elliptical lens" should be understood to apply generally to oval curves altered from pure circular shape to alleviate spherical aberration effects, even when they do not conform strictly to the classic formula of an ellipse.

Ellipsoidal or elliptical-cylinder (aspherical) lens surfaces that may be employed are, for an index of refraction of 1.586, a major to minor axis ratio of 1.29; and for an index of refraction of 1.567 a ratio of 1.30; and for an index of refraction of 1.5 a ratio of 1.34. See Table 1. Suitable elliptical-cylinder lens surfaces for any index of refraction can be calculated by Snell's law and conventional ray tracing techniques.

The discussion above with respect to the convex lenses 521 is generally applicable also to the concave lenses 519. In FIG. 1-A the radius of curvature of lenses 519 is one-half that of lenses 521, but the angle subtended by the arc of lenses 519 is approximately the same 80°. Accordingly, lenses 519 occupy only half of the back surface of sheet material 511 and the other area is occupied by the convex intervening spaces 520. Although conventional refracting lenses are disclosed herein, lens-like functions can be obtained with holographic lens based on diffraction phenomena, and substitution of holographic lenses for those specifically disclosed may be feasible and desirable in some circumstances.

From the above discussion and reference to FIGS. 1-A, 2, 3, and 4, it will be seen that the sheet material of FIG. 1-A provides a screen-type optical arrangement which provides a clear image of objects viewed through the sheet material from the top in FIG. 1-A when the viewing angle does not exceed 15° to 20°; when the viewing angle exceeds about 20°, the viewer sees instead a magnified representation of the multiplicity of intervening spaces 520 imprinted with graphic or textual images using printing pigment 725. Both in cases of effectively transparent image viewing, and of imprinted mask viewing, the viewed images are condensed in the sense that they are only strip samples of the full image, but the strips are so small and so closely spaced that they give the appearance of a complete image in a manner similar to the lines of a television screen display.

The elliptical configuration of lens surfaces according to the present invention is an important feature. Without the elliptical configuration the angular width of the transparent image window without significant distortion would be very narrow. Clearly it is necessary to have an appropriate ellipse major-to-minor axis ratio for the lens surfaces, and this is found to be dependent essentially on the index of refraction of the sheet material. The major-minor axis ratio (A/B) ranges from as high as about 1.35 to as low as about 1.25. The elliptical arc is at the end of a major axis. A particular A/B ratio can be determined by successive approximation ray tracing using Snell's Law and the index of refraction to determine proper arc slope at 30° (or 45°) off axis for causing the off axis ray focal point to substantially correspond to the near axis ray focal point. The A/B ratio which determines this arc slope is the desired A/B ratio. The inherent properties of the ellipse assure that a focal point (focal distance) match at 30° off axis will result in insignificant mismatch at points between 0° and 30° off axis. More sophisticated optical design techniques could no doubt be used to obtain the same results.

Sheet material 511 of FIGS. 1-A, 2, and 3, may also be modified to shift lenses 519 with respect to lenses 521. Whereas the lenses 519 and 521 in FIG. 1-A are represented as being substantially coaxial, they may be shifted in relative position so that the Galilean telescope formed thereby is, in effect, tilted left or right by an angle of a few degrees up to approximately 30°. In other words, the optical axes for the lens pairs may be non-perpendicular to the surfaces of the sheet material. It is only necessary that the lenses from one surface be in register with the lenses on the other surface, that is that they have the same relative orientation as to each pair of lenses.

Referring to FIG. 1-B, a sheet material 611 is shown which is formed of transparent plastic material similar to that of sheet material 511. The top or first surface of the sheet material 611 has converging lenses 621 formed therein as smooth, convex, elliptically cylindrical protuberances in the sheet material 611. The bottom or back surface of the sheet material 611 has indentations 619 formed therein which are smooth, concave, elliptically cylindrical surfaces acting as diverging lenticular lenses.

The lenses 619 are registered with lenses 621, and thus lenses 619 are optically coaxial with lenses 621. Lenses 619 are of lesser width than lenses 621 (typically one-half of the width) and the spaces between lenses 619 resulting from this lesser width are partially flat or planar surface portions 620.

Where the flat or planar area of surface portion 620 joins a lens 619, there is provided a rounded portion 622 with a radius much smaller than the effective radius of lens 619. This allows the partially flat portions 620 to be slightly convex so that high-speed printing using an off-set press or the like is facilitated by avoiding overrun of ink into lenses 621.

In FIG. 1-B, dimensions and locations are assigned reference letters for convenience in relating such to Table I and in explaining the inventions. The overall thickness of the sheet material 611 is designated by t, typically 0.627 mm or 0.0247". The center-to-center spacing of the lenses 621 which is also the center-to-center spacing of the lenses 619 is designated P, typically 0.4 mm or 0.0157". Alternative parameters for the configuration of FIG. 1-B are shown in Table 1.

Referring to FIG. 1-C, a sheet material 711 is shown which is formed of transparent plastic material similar to that of sheet material 511. The top or first surface of the sheet material 711 has converging lenses 721 formed therein as smooth convex elliptically cylindrical protuberances in the sheet material 711. The bottom or back surface of the sheet material 711 has lenses 719 formed therein by smooth, concave, elliptically cylindrical surfaces acting as diverging lenticular lenses. The index of refraction of sheet material 711 is assumed to be approximately 1.5 and a different index would change the dimensions below.

The lenses 719 are registered with lenses 721 and in the example of FIG. 1-C, lenses 719 are optically coaxial with lenses 721. Lenses 719 are of lesser width than lenses 721 and the spaces between lenses 719 resulting from this lesser width are generally flat or planar surface portions 720.

In FIG. 1-C dimensions and locations are assigned reference letters for convenience in relating such to Table I and in explaining the inventions. The overall thickness of the sheet material 711 is designated by t, typically 0.627 mm or 0.0247". The center to center spacing of the lenses 721 which is also the center to center spacing of the lenses 519 is designated P, typically 0.4 mm or 0.0157". The lenses 721 and 719 in FIG. 1-C are cylinders having elliptical arc configurations, but it will be understood that similar but more complex non-circular shapes could be employed in accordance with known optical techniques.

In FIG. 1-C the center of curvature of the circular surface of one of the lenses 721 is indicated at $C_1$. The center of curvature of the corresponding concave lens 719 circular surface is indicated at $C_2$. The corresponding radii of curvature are indicated by reference letters $R_1$, typically 0.4 mm or 0.0157" and $R_2$, (and typically 0.2 mm or 0.00787"). The focal point for the lenses 721 and 719 substantially coincide as described herein above. In accordance with known optical principles the focal length and focal point may be determined from the effective radii of curvature $R_1$ and $R_2$ and the index of refraction of the material of which sheet 711 is formed. Other dimensions of this and other lenses configurations are shown in Table I. Also illustrated in FIG. 1-C is the fact that parallel rays of light indicated at 731 and 732 which are caused to converge by lenses 721 will be caused to diverge by lenses 719 by just the amount necessary to restore them to parallelism. This is a consequence of the fact that focal points of the lenses 719 and 721 are approximately coincident.

Figure 5:
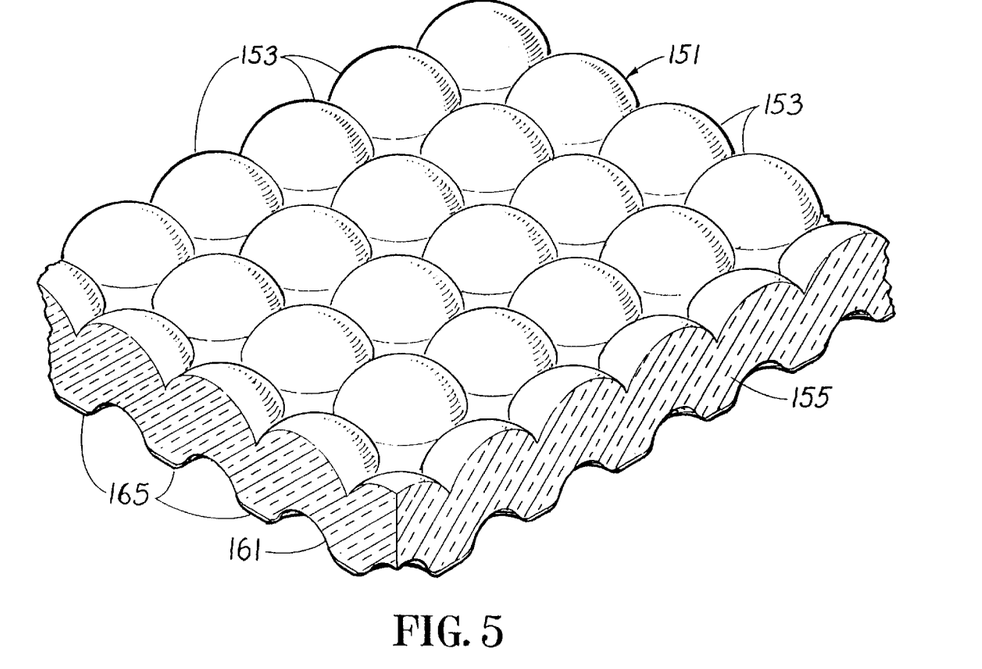
FIG. 5 is a greatly enlarged isometric view of another alternative form of sheet material employing spherical rather than lenticular lenses.

FIG. 5 shows a modification of sheet material according to the present invention which employs ellipsoidal, aspherical lenses rather than the lenticular lenses of FIG. 1-A, 1-B, or 1-C. Sheet material 151 is provided with a plurality of lenses 153 in the form of ellipsoidal segment projections. These lenses 153 may be arranged in a rectangular array of rows and columns as indicated in FIG. 5 or may be arranged in a hexagonal array. Lenses 153 may have small intervening spaces between them as shown in FIG. 5, or they may overlap and run together with no intervening spaces.

The back side of the sheet material 151 is provided with a rectangular array of concave lenses 161 which are in register with the lenses 153 on the front side. The effective radius of curvature and the aperture diameters of lenses 161 are approximately half that of lenses 153, leaving intervening spaces 165 between lenses 161 which may optionally be imprinted with a solid color pigment or imprinted with a graphic or textual pattern.

A sheet material of FIG. 5 virtually corresponds to sheet material 611 of FIG. 1-B except that the array of lenses is two-dimensional, rather than one-dimensional. The lenses 153 may have a diameter less than one millimeter; the actual appearance of a sheet material, particularly at a distance, will be much different than that perceived in the greatly enlarged view of FIG. 5. The primary functional difference of sheet material 151 relative to sheet material 511, 611 or 711 is the fact that its directional characteristics are two-dimensional rather than one-dimensional. Whereas sheet materials 511, 611 or 711 of FIG. 1-A through FIG. 3 restricts image transmission within a limited angle only from right to left, there is substantially no such limitation in other directions. Sheet material 151 of FIG. 5 has two-dimensional limited image transmission capability, both within angles to the right and left and angles up and down. The sheet material of FIG. 5 is useful in packaging applications similar to those previously described, solar energy control applications, and in other applications. The exemplary dimensions of Table I are also applicable to the system of FIG. 5.

Figure 7:
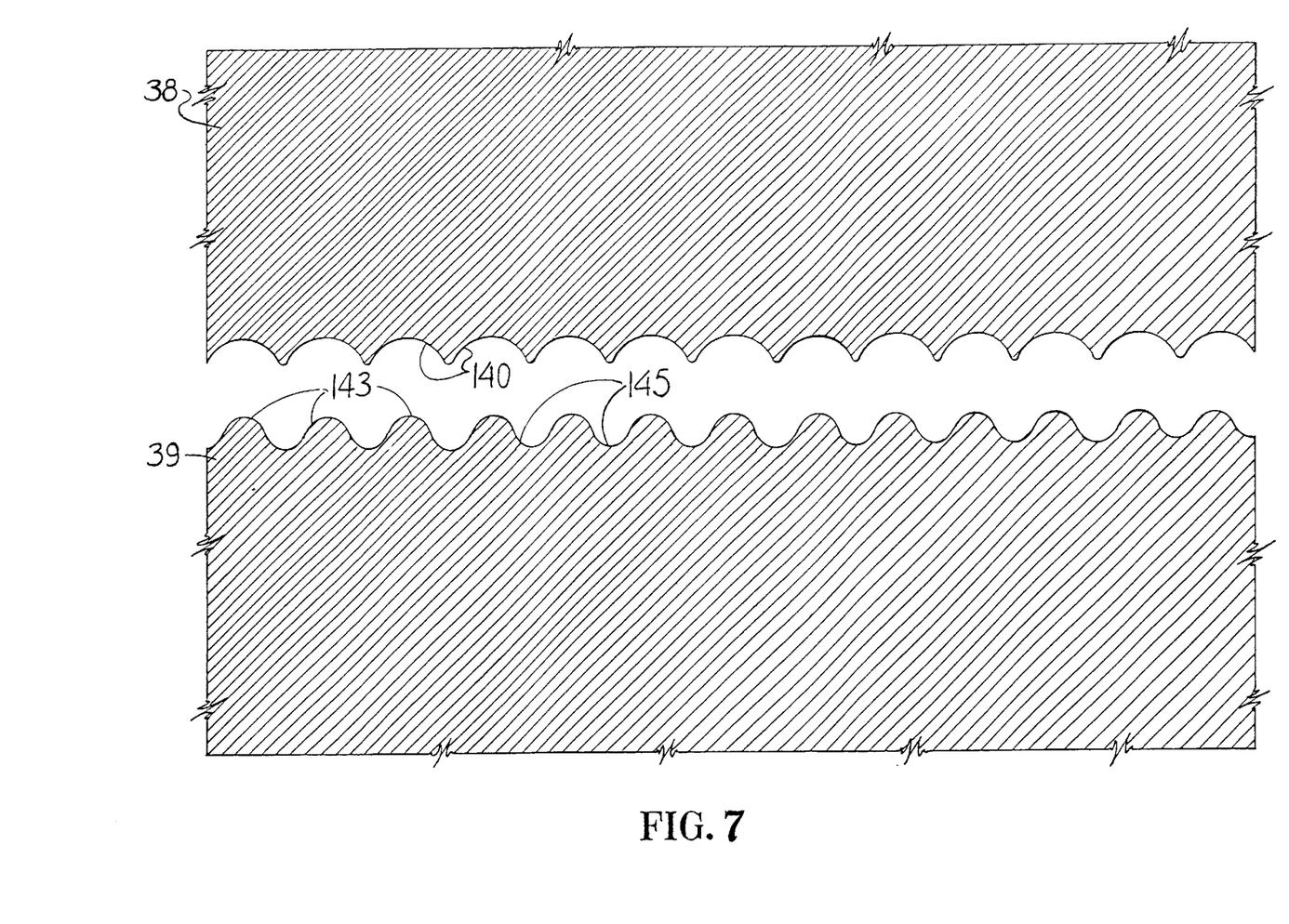
FIG. 7 is a greatly enlarged fragmentary sectional view of the embossing roll portion of the apparatus of FIG. 6.

TABLE 1 below gives exemplary dimensions for sheet materials of FIGS. 1–6.

extrudes a thin sheet 37 of plastic sheet material through a nozzle 35. The sheet 37 may be from about one foot to several feet in width, and, for example, may be about 0.04 inches (1 millimeter) thick. The sheet 37 passes immediately to embossing rolls 38 and 39 which are chilled rolls typically having a configuration as shown in FIG. 7 thereby shaping the sheet 37 in a manner similar to that shown for sheet 511 in FIG. 1-A. Alternatively, the extrusion or other forming process could be carried out separately and sheet 37 (if a thermoplastic material) could be reheated before passing through rolls 38 and 39 for the embossing process.

As shown in FIG. 7 it is preferred that embossing is done to produce the elongated lenses 521 generally parallel to the direction of travel of sheet 37. Thus, it is a simple matter to control registration of concave lens indentations 719 relative to lenses 721 by adjusting and fixing the relative position of arcuate grooves 140 relative to projections 143 as shown in FIG. 7. Embossing rolls such as 38 and 39 are sometimes machined with a helical cut for production of grooves 140 and projections 143, in which case the direction of the cuts, their pitch and the diameters of rolls 39 and 41 must be matched so that the registration will be maintained as rolls 39 and 41 turn at the same speed in opposite directions. Of course, if the grooves 140 and the projections 143 are cut as a series of circular elements rather than helically, the relative rotational position or diameters of rolls 38 and 39 is of no consequence.

It may be desired to provide additional cooling (not shown in FIG. 6) for sheet 37 after passing through rolls 38 and 39. In some cases it may be desired to provide sheet 37 with a film backing to create a generally flat surface on one side of the finished sheet material. It may be convenient to apply a backing sheet 56 in a continuous operation. A backing sheet 56 is laid down on sheet 37 from a supply roll (not shown), after which the sheets are pressed together by nip rolls 51 and 53.

A preferred material for sheet 37 is polyethylene terphthalate, grade G (PET-G) available from Eastman

TABLE 1

| REFRACTION INDEX (N) | PITCH (P) | EFFECTIVE RADII ($R_1$, $R_2$) | $C_1$ to $C_2$ DISTANCE (D) | TOTAL THICKNESS (t) | ANGULAR WIDTHS ($A_1$, $A_2$) | ELLIPSE (A/B) |
|---|---|---|---|---|---|---|
| 1.5 | 0.0157" | 0.0157", −0.00787" | 0.0157" | 0.0247" | 60°, 60° | .0282/ .0210 |
| 1.5 | 0.0236" | 0.0236", −0.0118" | 0.0236" | 0.0378" | 60°, 60° | .0424/ .0316 |
| 1.567 | 0.0125" | 0.00967", −0.00481" | 0.00848" | 0.0160" | 80°, 80° | .01624/ .0125 |
| 1.586 | 0.1083" | 0.0625", −0.3125" | 0.050" | 0.0969" | 120°, 120° | .104/ .0806 |
| 1.567 | 0.0125" | 0.0096", −0.0048" | 0.0085" | 0.0148" | 80°, 80° | .01624/ .0125 |
| 1.567 | 0.0125" | 0.0096", −0.0072" | 0.00425" | 0.0074" | 80°, 60° | .01624/ .0125 |

The configuration of the sheet material 511, 611 or 711 as shown in FIGS. 1-A, 1-B, or 1-C is particularly well suited to economical manufacture because registration between convex lenses forming projections, and concave lenses forming indentations can be assured in a single two-side embossing operation by which the sheet material 511, 611 or 711 may be formed.

Figure 6:
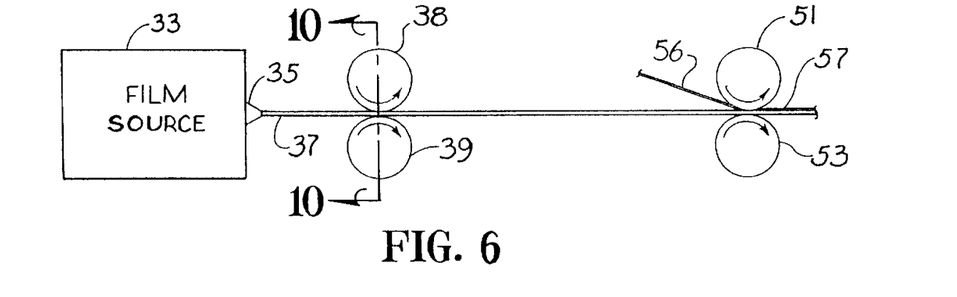
FIG. 6 is a partially schematic illustration of apparatus for producing sheet material according to the invention by a roll embossing process.

FIG. 6 shows a schematic illustration of a configuration of generally conventional manufacturing apparatus which is suitable for forming sheet material 511 as shown in FIG. 1-A, for example. A sheet extruder 33 of conventional form Chemical. It has an index of refraction of about 1.567. Another material for sheet 37 is polycarbonate plastic. Other suitable materials in particular circumstances may include polyvinyl chloride, PVC with UV inhibitors, acrylic plastic, and other thermoplastic or thermosetting transparent materials.

Suitable material compositions for opaque mask 47 may include polyether plastics, cellulosic plastics, or one of the above mentioned plastics with a dye or coloring agent dispersed therein such as calcium carbonate, magnesium oxide, or other conventional white pigment or dye.

Plastic sheet 56 is preferably formed of the same material as plastic sheet 37, or may alternatively be formed of polyvinyl chloride, acetates, polyethylene, polypropylene, or acrylic plastics.

The sheet 511 in FIG. 1-A may have a total thickness indicated at t from 0.004 inches (0.1 millimeters) to 0.2 inches (5 millimeters). Typically the effective radius of curvature of the lenses 521 formed in sheet 511 will be about ½ to ⅔ of such total thickness. The thickness of the flat transparent sheet 56 may be about one-third of the thickness of sheet 37, but this dimension is variable within wide limits, and in many applications the sheet 56 would be omitted entirely.

Thus, it will be seen from FIGS. 6 and 7 that an important advantage of the configuration of sheet material shown in FIGS. 1 and 5 is the ease with which such film can be manufactured by generally conventional processes, and the fact that film having very small lenticular lens radii below 1.0 millimeter (0.04 inches) can be employed with ease because the lenses and the mask forming elements are produced and located in a single operation of two-side embossing or the like. Alternatively, other processes than roll embossing may be used to form sheet material such as sheet material 511, 611 or 711, as convenient. It should be noted that the sheet 56 which optionally is laminated to sheet material 511, sheet material 611, or sheet material 711 may be applied on either side of sheet material 511 (or one of the other sheets) to form a composite sheet 57 as illustrated in FIG. 6. For clarity and simplicity the addition of a transparent sheet of uniform thickness such as sheet 56 is not illustrated in FIGS. 1-A, 1-B, or 1-C. It is apparent, however, that the lamination of such a sheet over either one of the convex lens surfaces or one of the concave lens surfaces, or both, will provide a substantially flat exterior surface for the sheet material which may be desirable in some cases. In addition, particularly when the sheet is applied over the surface having convex lenses formed therein, a significant dead-air space will be provided that will increase the thermal insulating properties of the composite sheet 57 formed of embossed sheet 37 and uniform thickness sheet 56. If desired, a further sheet of uniform thickness similar to sheet 56 could be applied to the opposite surface of sheet 37 thereby forming a sheet material of three layers with substantially smooth flat surfaces on both sides.

From the foregoing description and explanation, it will be seen that the invention provides a directional image transmission sheet and a particular process for making such sheet which has advantageous features for a wide variety of uses including such diverse uses as wrapping film and solar energy control sheet material for incorporation in windows for buildings or other structures. In addition to the modifications and variations to the invention shown, described or suggested above, it will be apparent to those skilled in the art that numerous other modifications may be made to better suit the uses or circumstances for which the sheet material is to be employed. Accordingly, the scope of the invention is not to be considered limited to those embodiments shown, described or suggested herein, but is to be determined with reference to the appended claims.

Although the theory of operation and design factors presented above is believed correct, the operability, utility, and advantages of sheet materials according to the invention should be based on actual results and performance thereof rather than upon theoretical principles or mathematical analysis.

What is claimed is:

1. A partially transparent sheet for directional light transmission and image viewing comprising:

a body of at least partially transparent solid material with a predetermined thickness substantially less than its other dimensions, and having a front surface and a back surface;

a multiplicity of convex lenses with cross-section of an arc of an ellipse with a predetermined index of refraction covering a substantial area on said body front surface with each of said lenses having a least transverse dimension of less than two millimeters;

said arc of said ellipse being at a major axis of said ellipse which has a major axis to minor axis ratio of between 1.25:1 and 1.35:1, said ellipse having a minor axis of from 0.02 to 4.0 millimeters;

a multiplicity of concave lenses with a predetermined index of refraction of said body back surface, each being generally in register with a respective one of said convex lenses, the effective radii of curvature of said concave lenses being selected with regard to the effective radii of curvature of said convex lenses, said index of refraction, and said body thickness to cause parallel rays converged by said convex lenses to be returned approximately to parallelism upon passing through said concave lenses;

whereby said sheet, when viewed in a direction nearly parallel with the paths from lenses on the front surface to corresponding lenses on the back surface, appears transparent and transmits a substantially undistorted image, while said sheet appears non-transparent to images when viewed in a different direction.

2. A sheet as recited in claim 1 wherein said at least partially transparent solid material is a sheet of plastic with a thickness of from 0.02 to 4.0 millimeters.

3. A sheet as recited in claim 2 wherein the least transverse dimension of said concave lenses is less than three-fourths of the center-to-center pitch thereof.

4. A sheet as recited in claim 3 wherein surfaces between said concave lenses is at least in part in the form of a convex arcuate surface.

5. A sheet as recited in claim 4 wherein said convex lenses and said concave lenses are lenticular lenses with substantially mutually parallel orientation.

6. A sheet as recited in claim 4 wherein the distance separating each said concave lens from its corresponding convex lens is between 0.8 times and 1.2 times the difference of the absolute values of the focal lengths thereof.

7. A sheet as recited in claim 1 wherein said convex lenses are formed integrally in said at least partially solid material.

8. A sheet as recited in claim 1 wherein said convex lenses and said concave lenses are lenticular lenses.

9. A sheet as recited in claim 1 wherein the distance separating each said concave lens from its corresponding convex lens is between 0.8 times and 1.2 times the difference of the absolute values of the focal lengths thereof.

10. A partially transparent sheet for directional light transmission and image viewing comprising:

a body of at least partially transparent solid material with a predetermined thickness substantially less than its other dimensions, and having a front surface and a back surface;

a multiplicity of convex lenses with cross-section of an arc of an ellipse with a predetermined index of refraction covering a substantial area on said body front surface with each of said lenses having a least transverse dimension of less than two millimeters;

said arc of said ellipse being at a major axis of said ellipse which has a major axis to minor axis ratio of between 1.25:1 and 1.35:1, said ellipse having a minor axis of from 0.02 to 4.0 millimeters;

a multiplicity of concave lenses with a predetermined index of refraction of said body back surface, each being generally in register with a respective one of said convex lenses, the effective radii of curvature of said concave lenses being selected with regard to the effective radii of curvature of said convex lenses, said index of refraction, and said body thickness to cause parallel rays converged by said convex lenses to be returned approximately to parallelism upon passing through said concave lenses;

said convex lenses and said concave lenses being lenticular lenses with substantially mutually parallel orientation;

whereby said sheet, when viewed in a direction nearly parallel with the paths from lenses on the front surface to corresponding lenses on the back surface, appears transparent and transmits a substantially undistorted image, while said sheet appears non-transparent to images when viewed in a different direction.

11. A sheet as recited in claim 10 wherein said at least partially transparent solid material is a sheet of plastic with a thickness of from 0.02 to 4.0 millimeters.

12. A sheet as recited in claim 11 wherein said convex lenses are formed integrally in said at least partially transparent solid material.

13. A sheet as recited in claim 11 wherein the least transverse dimension of said concave lenses is less than three-fourths of the center to center pitch thereof.

14. A sheet as recited in claim 13 wherein surfaces between said concave lenses is at least in part in the form of a convex arcuate surface.

15. A sheet as recited in claim 14 wherein the distance separating each said concave lens from its corresponding convex lens is between 0.8 times and 1.2 times the difference of the absolute values of the focal lengths thereof.

16. A sheet as recited in claim 10 wherein said convex lenses are formed integrally in said at least partially solid material.

17. A sheet as recited in claim 10 wherein the least transverse dimension of said concave lenses is less than three-fourths of the center to center pitch thereof.

18. A sheet as recited in claim 10 wherein the distance separating each said concave lens from its corresponding convex lens is between 0.8 times and 1.2 times the difference of the absolute values of the focal lengths thereof.

* * * * *

UNITED STATES PATENT AND TRADEMARK OFFICE
Certificate

Patent No. 5,933,276            Patented: August 3, 1999

On petition requesting issuance of a certificate for correction of inventorship pursuant to 35 U.S.C. 256, it has been found that the above-identified patent, through error and without deceptive intent, improperly sets forth the inventorship.

Accordingly, it is hereby certified that the correct inventorship of this patent is: Robert A. Falcinelli, Fayetteville, Arkansas; John Allan Magee, Fayetteville, Arkansas.

Signed and Sealed this Twenty-fourth Day of April, 2001.

RUSSELL E. ADAMS
*Supervisory Patent Examiner*
Art Unit 2851